US010250770B2

(12) United States Patent
Takahashi

(10) Patent No.: US 10,250,770 B2
(45) Date of Patent: Apr. 2, 2019

(54) IMAGE READING DEVICE, IMAGE FORMING APPARATUS, AND METHOD FOR CONTROLLING IMAGE READING DEVICE

(71) Applicant: KYOCERA Document Solutions Inc., Osaka (JP)

(72) Inventor: Masayoshi Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/819,802

(22) Filed: Nov. 21, 2017

(65) Prior Publication Data
US 2018/0152578 A1 May 31, 2018

(30) Foreign Application Priority Data

Nov. 25, 2016 (JP) ................. 2016-229247

(51) Int. Cl.
*H04N 1/00* (2006.01)
*H04N 1/193* (2006.01)

(52) U.S. Cl.
CPC ....... *H04N 1/00803* (2013.01); *H04N 1/0071* (2013.01); *H04N 1/00726* (2013.01); *H04N 1/00745* (2013.01); *H04N 1/1937* (2013.01); *H04N 2201/0094* (2013.01)

(58) Field of Classification Search
CPC ............. H04N 1/4076; H04N 1/00708; H04N 1/00729; H04N 1/00755; H04N 1/401; H04N 1/00013; H04N 1/00045; H04N 1/00063; H04N 1/00071; H04N 1/00588; H04N 1/00689; H04N 1/00758; H04N 1/0461; H04N 1/10; H04N 1/125; H04N 1/19; H04N 1/203; H04N 1/2346; H04N 2201/0081; H04N 2201/0094
USPC ........ 358/461, 449, 1.13, 1.2, 1.9, 406, 474, 358/494, 497, 514, 529; 399/370, 376
See application file for complete search history.

(56) References Cited

U.S. PATENT DOCUMENTS

| 2001/0035985 | A1* | 11/2001 | Takahashi | .......... H04N 1/00795 358/471 |
| 2003/0099000 | A1* | 5/2003 | Hiromatsu | ........... H04N 1/4076 358/461 |
| 2005/0078973 | A1 | 4/2005 | Suzuki | ............................ 399/45 |
| 2005/0089447 | A1* | 4/2005 | Okada | .................. C12Q 1/6825 422/68.1 |
| 2005/0126459 | A1* | 6/2005 | Ebata | ................... D05B 37/063 112/122 |

(Continued)

FOREIGN PATENT DOCUMENTS

JP 2005-70508 A 3/2005

*Primary Examiner* — Negussie Worku
(74) *Attorney, Agent, or Firm* — Stein IP, LLC

(57) ABSTRACT

An image reading device includes a contact glass, a first lamp, an image sensor, a first lamp, a light absorbing member, and a second lamp. When reading a document, in a first period, the first lamp is turned on while the second lamp is turned off. In a second period, the second lamp is turned on while the first lamp is turned off. On the basis of first image data obtained by reading in the first period and second image data obtained by reading in the second period, the control unit determines whether each pixel in the first image data is a pixel having read document data or not.

12 Claims, 9 Drawing Sheets

(56) References Cited

U.S. PATENT DOCUMENTS

| | | | | |
|---|---|---|---|---|
| 2006/0250661 A1* | 11/2006 | Susaki | ............ | H04N 1/401 |
| | | | | 358/461 |
| 2007/0098421 A1* | 5/2007 | Takahashi | ...... | G03G 15/5029 |
| | | | | 399/44 |
| 2008/0019749 A1 | 1/2008 | Suzuki | .................. | 399/389 |
| 2016/0028916 A1* | 1/2016 | Fukawa | ............ | H04N 1/125 |
| | | | | 358/1.13 |
| 2018/0213124 A1* | 7/2018 | Yokohama | ......... | H04N 1/401 |

\* cited by examiner

ONE SIDE
OTHER SIDE

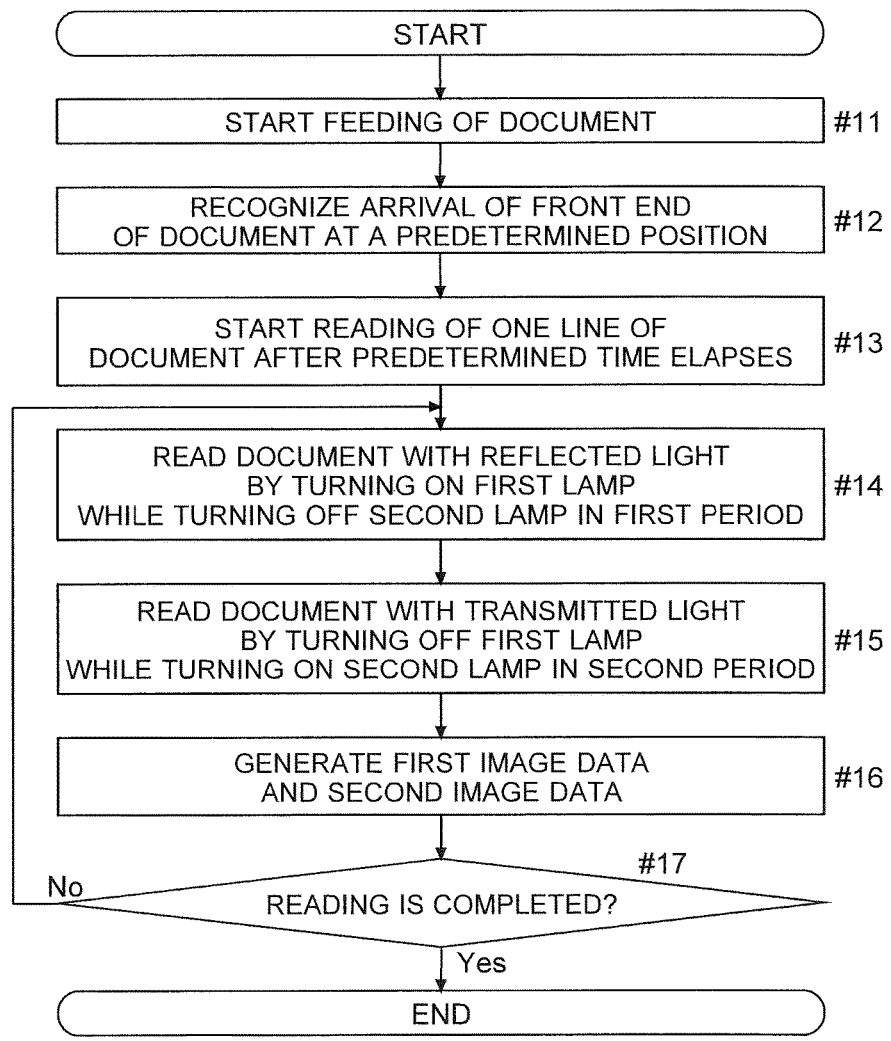

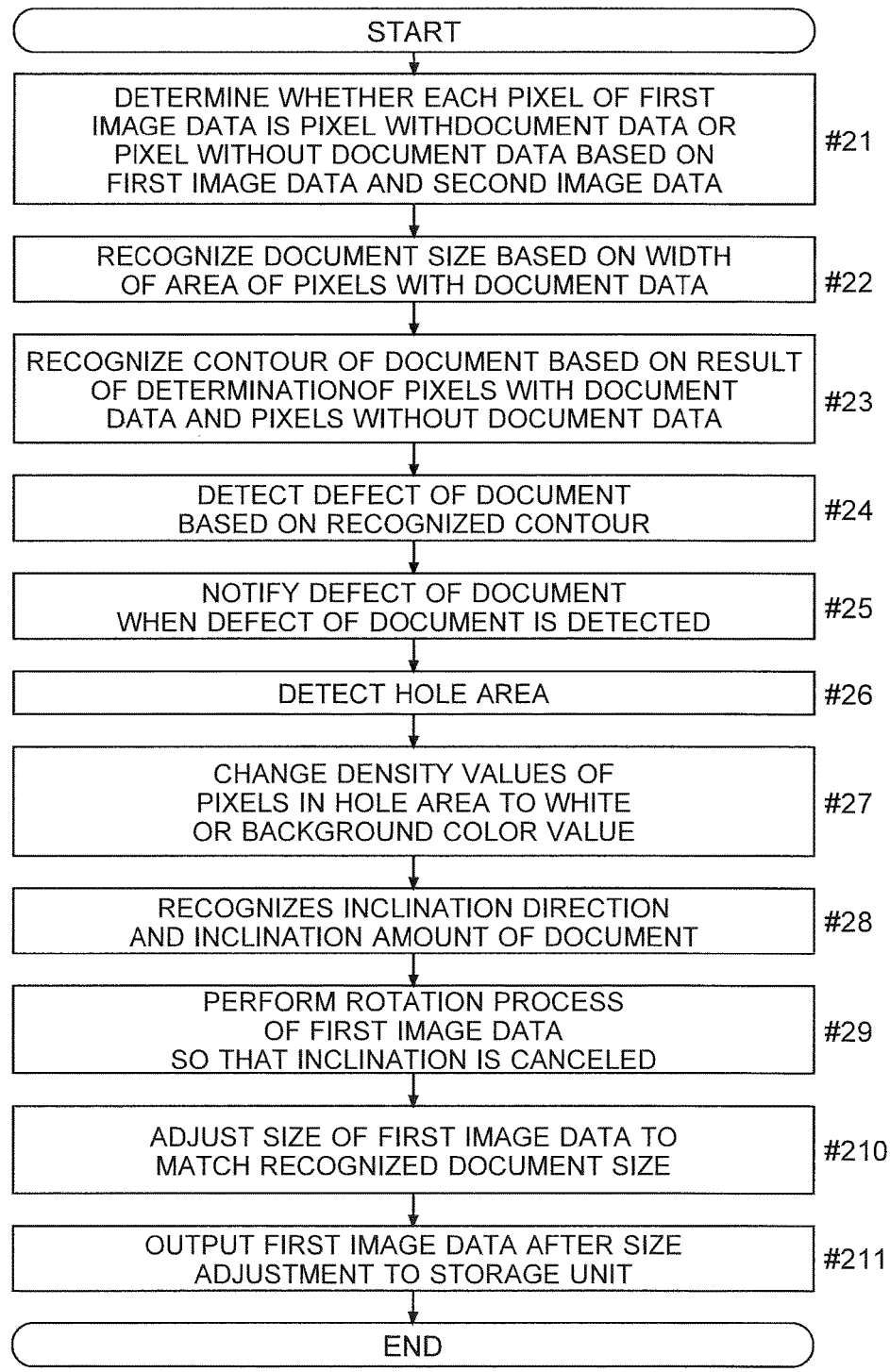

FIG.10

| OBJECT | CONDITIONS | DETERMINATION RESULT |
|---|---|---|
| FIRST IMAGE DATA | DENSITY VALUE IS BRIGHTER THAN FIRST THRESHOLD VALUE | PIXEL WITH DOCUMENT DATA |
| SECOND IMAGE DATA | DENSITY VALUE IS DARKER THAN SECOND THRESHOLD VALUE | PIXEL WITH DOCUMENT DATA |
| FIRST IMAGE DATA AND SECOND IMAGE DATA | FIRST IMAGE DATA HAS DENSITY VALUE EQUAL TO OR DARKER THAN FIRST THRESHOLD VALUE, AND SECOND IMAGE DATA HAS DENSITY VALUE EQUAL TO OR BRIGHTER THAN SECOND THRESHOLD VALUE | PIXEL WITHOUT DOCUMENT DATA |

IMAGE READING DEVICE, IMAGE FORMING APPARATUS, AND METHOD FOR CONTROLLING IMAGE READING DEVICE

INCORPORATION BY REFERENCE

This application is based upon and claims the benefit of priority from the corresponding Japanese Patent Application No. 2016-229247 filed Nov. 25, 2016, the entire contents of which are hereby incorporated by reference.

BACKGROUND

The present disclosure relates to an image reading device that reads a document and generates image data, and to an image forming apparatus including the image reading device.

It may be performed to irradiate both sides of a paper sheet with light for detection about the paper sheet. For example, a following image forming apparatus is known. Specifically, there is known an image forming apparatus, which includes a printer engine that performs image formation, supplies a medium (paper sheet) to the printer engine, irradiates the medium with light at a predetermined position in a conveyance path, receives transmitted light through the medium, receives reflected light from the medium, determines a thickness of the medium based on received light detection signals of the irradiation light, the transmitted light, and the reflected light, and performs predetermined control based on a result of the determination. In this known image forming apparatus, printing is performed according to a thickness of the paper sheet based on a result of detection of the thickness of the paper sheet. For example, transfer current or temperature of a fixing device is changed according to the thickness of the paper sheet.

The image reading device (scanner) is provided with a light source. The light source emits light to a document. The document reflects the light. The reflected light enters an image sensor. The document is read based on the light reflected by the document.

When reading a document, there may be a need to obtain information about the document. For example, there may be a need to obtain information such as an end position of the document, inclination of the document, and presence or absence of a hole in the document. Recognition of end positions enables to detect an accurate size of the document. Accurate detection of inclination of the document enables to accurately correct the inclination. Accurate detection of presence or absence of a hole in the document enables to easily delete an unnecessary part of the image data corresponding to the hole.

In order to obtain information about the document, it is necessary to distinguish a part with document data from a part without document data in the image data obtained by reading. In other words, it is necessary to distinguish a pixel having read document data from a pixel having no read document data in the image data.

Conventionally, a white color member is used as a background member of a document. In other words, a white color plate is disposed on the backside of the document viewed from the light source and the image sensor. A density value (pixel value) of a pixel having no read document data becomes a white (bright) value. Further, the paper sheet usually has white color. There is a problem that in the image data read with the reflected light, a pixel having read document data cannot be correctly distinguished from a pixel having no read document data.

The known image forming apparatus described above irradiates the paper sheet with light in the same manner as the image reading device. On the basis of the determined reflectance and transmittance, it is determined whether the paper sheet is thick paper or not. However, it is not possible to distinguish a pixel having read document data from a pixel having no read document data in the image data. Therefore, the above-mentioned problem cannot be solved.

SUMMARY

An image reading device according to the present disclosure includes a contact glass, a first lamp, an image sensor, a light absorbing member, a second lamp, a control unit, and a determining unit. A document is fed on one side of the contact glass. The first lamp is disposed on the other side of the contact glass. The first lamp emits light to the one side of the contact glass. The image sensor is disposed on the other side of the contact glass. The image sensor receives light emitted from the first lamp and reflected by the document. The light absorbing member is disposed on the one side of the contact glass. The light absorbing member is disposed at a position irradiated with light emitted from the first lamp and transmitted by the contact glass. The second lamp is disposed on the one side of the contact glass. The second lamp is disposed at a position farther from the contact glass than the document feeding path so as to emit light to the image sensor. The control unit controls to read with the reflected light by turning on the first lamp while turning off the second lamp in a first period of a reading period of one line when reading a document, and controls to read with the transmitted light by turning on the second lamp while turning off the first lamp in a second period. The determining unit determines whether each pixel in the first image data is a pixel with document data that is a pixel having read document data or a pixel without document data that is a pixel having no read document data, on the basis of first image data obtained by reading in the first period and second image data obtained by reading in the second period. The determining unit determines a pixel in the first image data having a density value brighter than a predetermined first threshold value to be the pixel with document data. The determining unit checks a dark pixel in the second image data having a density value darker than a predetermined second threshold value, so as to determine a pixel in the first image data at a position corresponding to the dark pixel to be the pixel with document data.

Further features and advantages of the present disclosure will become more apparent from the description of embodiments given below.

BRIEF DESCRIPTION OF THE DRAWINGS

FIG. 8 is a flowchart showing an example of flow of feed reading by the image reading device according to the embodiment.

FIG. 9 is a flowchart showing an example of determination of a pixel with document data and a pixel without document data by the image reading device according to the embodiment.

FIG. 10 is a diagram showing an example of determination of a pixel with document data and a pixel without document data according to the embodiment.

DETAILED DESCRIPTION

In the present disclosure, a pixel having read document data and a pixel having no read document data are accurately distinguished from each other in document image data. Hereinafter, with reference to FIGS. 1 to 11, an image reading device 100 and an image forming apparatus including the image reading device 100 are described. A multifunction peripheral 200 is exemplified and described as the image forming apparatus. Elements such as structures and layouts described in this embodiment are merely examples for description and do not limit the scope of the disclosure.

(Multifunction Peripheral 200)

Figure 1:
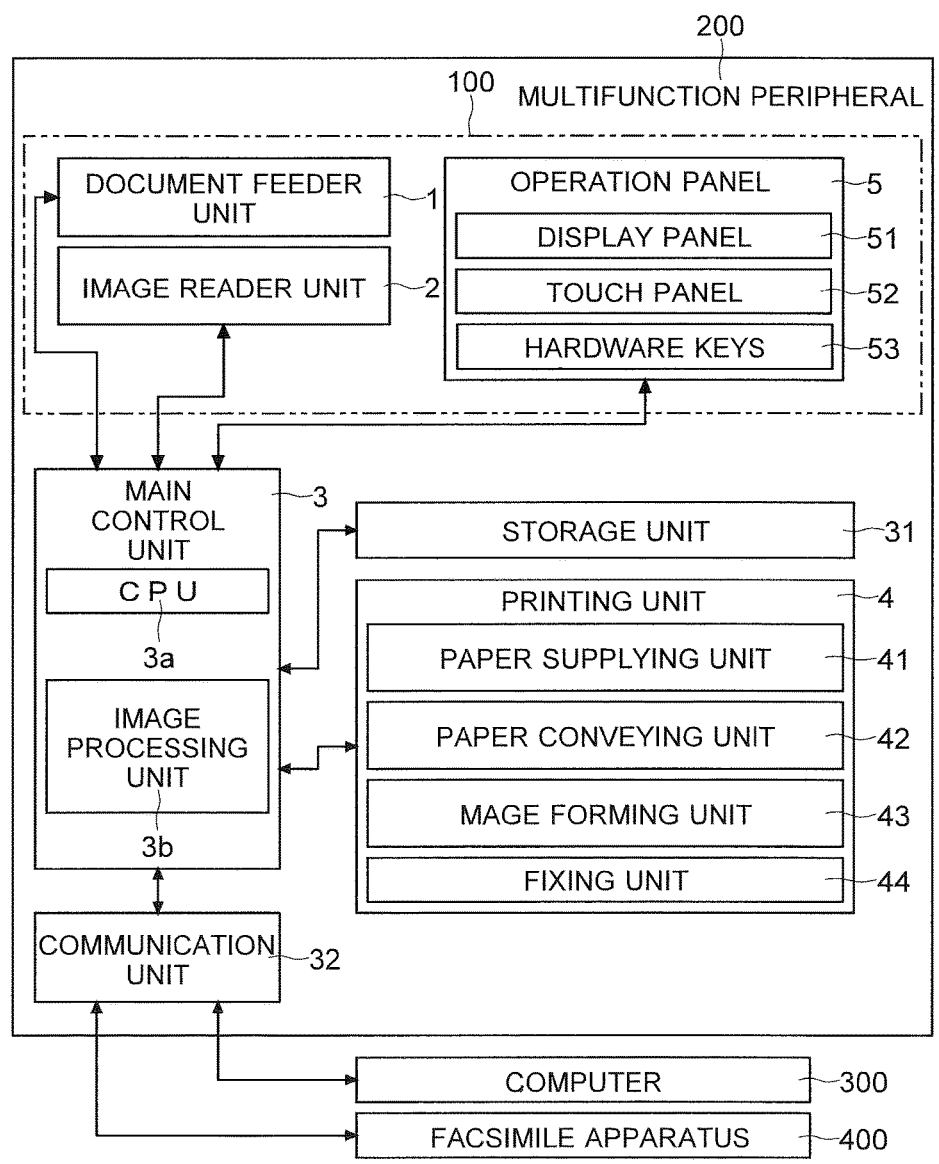
FIG. 1 is a diagram showing an example of a multifunction peripheral according to an embodiment.

With reference to FIG. 1, the multifunction peripheral 200 according to the embodiment is described. As shown in FIG. 1, the multifunction peripheral 200 includes a document feeder unit 1, an image reader unit 2, a main control unit 3, a storage unit 31, a printing unit 4, an operation panel 5 (corresponding to a notifying unit), and a communication unit 32. The image reading device 100 includes the document feeder unit 1, the image reader unit 2, and the operation panel 5.

The main control unit 3 performs overall control of the multifunction peripheral 200. The main control unit 3 includes a CPU 3a and an image processing unit 3b. The multifunction peripheral 200 includes the storage unit 31. The storage unit 31 includes a nonvolatile storage device such as a ROM, an HDD, and a flash ROM. The storage unit 31 includes a volatile storage device such as a RAM. The main control unit 3 uses programs and data stored in the storage unit 31 so as to control the individual units. The main control unit 3 controls scanning in a job such as copying or transmission. In addition, the main control unit 3 controls printing, transmission, and storing of image data. The image processing unit 3b performs image processing corresponding to the job on the image data generated by the image reader unit 2.

The printing unit 4 includes a paper supplying unit 41, a paper conveying unit 42, an image forming unit 43, and a fixing unit 44. In a print job, the main control unit 3 controls the paper supplying unit 41 to supply a paper sheet. The main control unit 3 controls the paper conveying unit 42 to convey the paper sheet. The paper conveying unit 42 discharges the paper sheet after printing to an outside of the apparatus. The main control unit 3 controls the image forming unit 43 to form toner image based on image data. The main control unit 3 controls the image forming unit 43 to transfer the toner image onto the conveyed paper sheet. The main control unit 3 controls the fixing unit 44 to fix the transferred toner image to the paper sheet. In this way, the main control unit 3 controls operation of the printing unit 4.

The operation panel 5 includes a display panel 51, a touch panel 52, and hardware keys 53. The main control unit 3 controls the display panel 51 to display a message about a state of the multifunction peripheral 200 and a setting screen. On the basis of an output of the touch panel 52, the main control unit 3 recognizes a touched image among operation images displayed on the display panel 51. The operation images are keys and buttons. The hardware keys 53 include a start key and a ten key. The start key is used for instructing to start execution of a job. The ten key is used for inputting numbers. The operation panel 5 receives setting operation (about a job) with the touch panel 52 and the hardware keys 53. The main control unit 3 communicates with the operation panel 5. The main control unit 3 recognizes set contents. Note that the operation panel 5 also functions as a portion that performs setting and displaying concerning the image reading device 100.

The multifunction peripheral 200 includes the communication unit 32. The communication unit 32 is connected to a computer 300 and a facsimile apparatus 400 in a communicable manner. The computer 300 is a PC or a server, for example. The computer 300 or the facsimile apparatus 400 is set as a destination with the operation panel 5. The main control unit 3 controls the communication unit 32 to transmit image data based on a result of reading a document to a set destination (as scan transmission or FAX transmission). In addition, the communication unit 32 receives print data from the computer 300 or the facsimile apparatus 400. The main control unit 3 controls the printing unit 4 to perform printing based on the received print data (as a print job or FAX reception printing).

(Image Reader Unit 2 and Document Feeder Unit 1)

Figure 2:
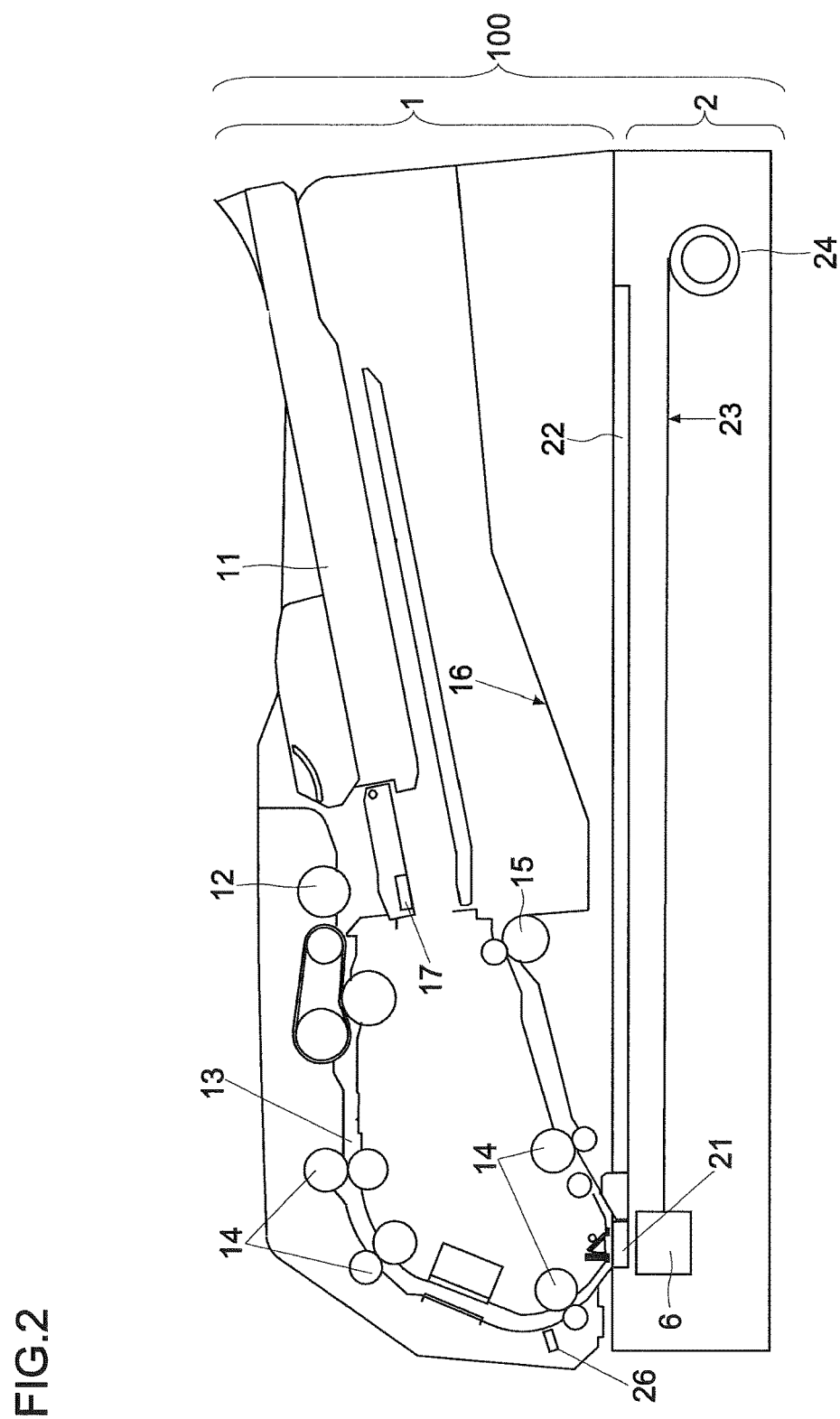
FIG. 2 is a diagram showing an example of an image reading device according to the embodiment.
Figure 3:
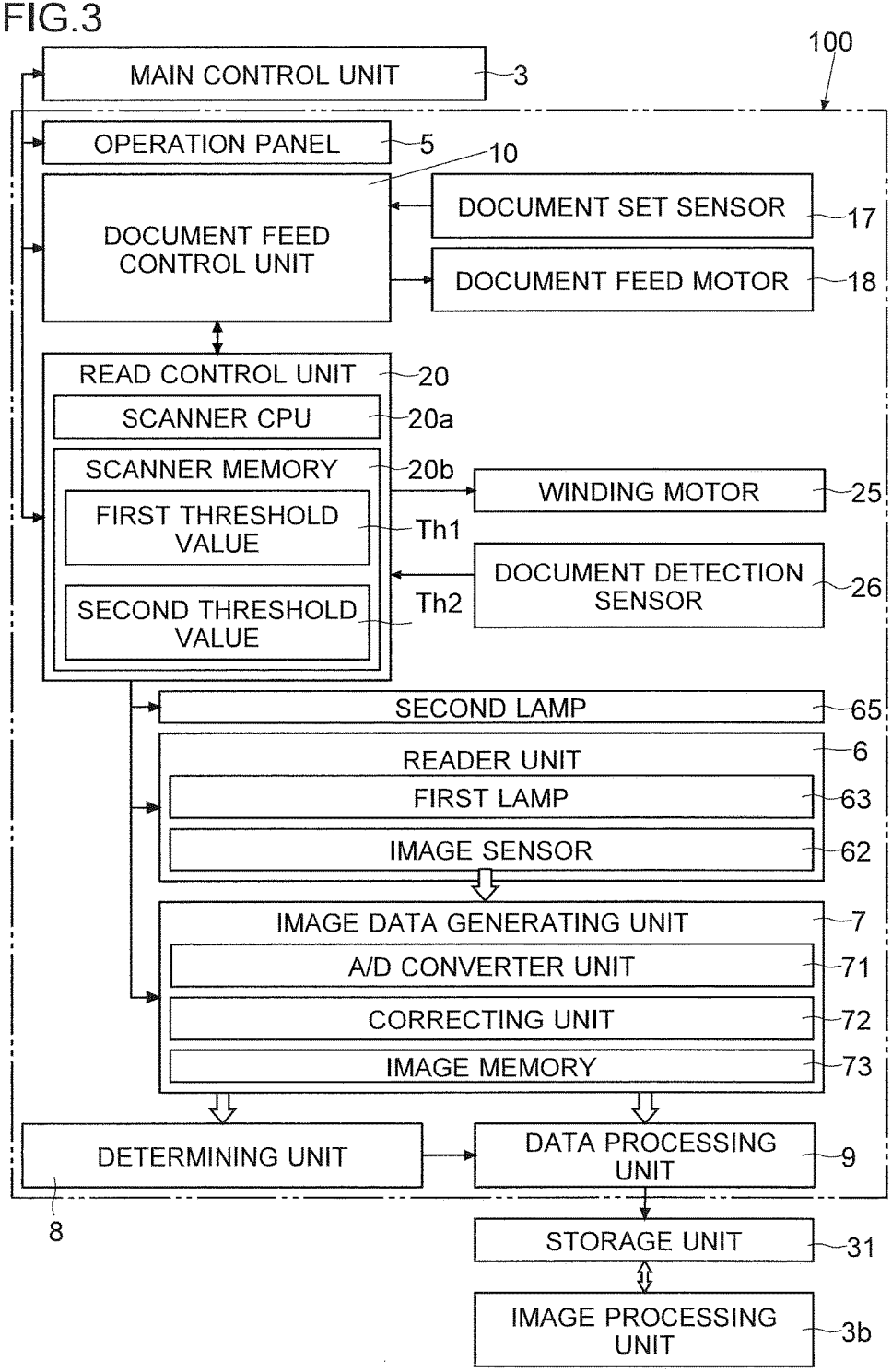
FIG. 3 is a diagram showing an example of the image reading device according to the embodiment.

Next, with reference to FIGS. 2 and 3, the image reading device 100 according to the embodiment is described. As shown in FIG. 2, the document feeder unit 1 is disposed above the image reader unit 2. The document feeder unit 1 opens and closes in the up and down direction with respect to the image reader unit 2. The document feeder unit 1 functions as a cover that presses a document from above. The document feeder unit 1 feeds a set document to a feed reading contact glass 21 (reading position). The document feeder unit 1 includes, from an upstream in a document feed direction, a document tray 11, a supply roller 12, a document feeding path 13, a plurality of feed roller pairs 14, a discharge roller pair 15, and a discharge tray 16. The document tray 11 is provided with a document set sensor 17 (see FIG. 2).

As shown in FIG. 3, the image reading device 100 (in the document feeder unit 1) is provided with a document feed control unit 10. The document feed control unit 10 is a circuit board including a CPU and a memory. An output of the document set sensor 17 is input to the document feed control unit 10. The document feed control unit 10 recognizes (detects) presence or absence of a paper sheet on the document tray 11 based on an output from the document set sensor 17.

When an instruction to execute a document read job is issued from the operation panel 5 (when the start key is operated), the main control unit 3 communicates with the document feed control unit 10. The main control unit 3 checks whether or not there is a document set on the document tray 11. When there is a document on the document tray 11, the main control unit 3 issues a document feed instruction. When receiving this instruction, the document feed control unit 10 controls a document feed motor 18 to drive. The document feed motor 18 drives the supply roller 12 and the feed roller pair 14 to rotate. The document is fed to the reading position. The document passes an upper side (one side) of a feed reading contact glass 21 disposed on an upper surface of the image reader unit 2. When it passes, the image reader unit 2 (a reader unit 6) reads the document (as feed reading).

As shown in FIG. 2, the feed reading contact glass 21 is disposed on the left side of the upper surface of the image reader unit 2. A place reading contact glass 22 is disposed on the upper surface of the image reader unit 2 and on the right side of the feed reading contact glass 21. The place reading contact glass 22 is used for placing a document such as a book. When there is no document set on the document feeder unit 1, the image reader unit 2 irradiates a document placed on the place reading contact glass 22 with light. The image processing unit 3b reads the surface of the placed document so as to generate image data (as table reading).

As shown in FIG. 3, the image reader unit 2 is provided with a read control unit 20 (corresponding to a control unit). The read control unit 20 controls operation of the image reader unit 2. The read control unit 20 is a circuit board including a scanner CPU 20a, a scanner memory 20b, and other circuits. The read control unit 20 receives an instruction and a signal from the main control unit 3 so as to read a document.

As shown in FIG. 2, the image reader unit 2 includes the reader unit 6, a wire 23, and a winding drum 24. The wire 23 is connected to the reader unit 6 and the winding drum 24. The winding drum 24 is driven to rotate by a winding motor 25 (see FIG. 3) that rotates forward and backward. In the table reading, the read control unit 20 controls the winding drum 24 to rotate. Thus, the reader unit 6 is moved horizontally (in a sub-scanning direction or the left and right direction in FIG. 2). In the feed reading, the read control unit 20 fixes the reader unit 6 at the position below the feed reading contact glass 21.

As shown in FIG. 3, the reader unit 6, an image data generating unit 7, a determining unit 8, and a data processing unit 9 are disposed in the image reader unit 2. The reader unit 6 is a CIS type unit. The reader unit 6 irradiates a document with light. The reader unit 6 includes an image sensor 62. The image sensor 62 includes light receiving elements (pixels) arranged in a main scanning direction. Each light receiving element outputs an analog electric signal corresponding to reflected light intensity. Details of the determining unit 8 and the data processing unit 9 will be described later.

The image data generating unit 7 includes an A/D converter unit 71, a correcting unit 72, and an image memory 73. The A/D converter unit 71 processes the analog signal from each light receiving element of the image sensor 62. The A/D converter unit 71 converts the analog signal from each light receiving element into a digital value (having 8 bits or 10 bits, for example). The correcting unit 72 corrects density distortion due to read characteristics. For example, the correcting unit 72 performs shading correction. The image data of each line generated by the image data generating unit 7 is stored in the image memory 73.

(Mechanism Related to Feed Reading)

Figure 4:
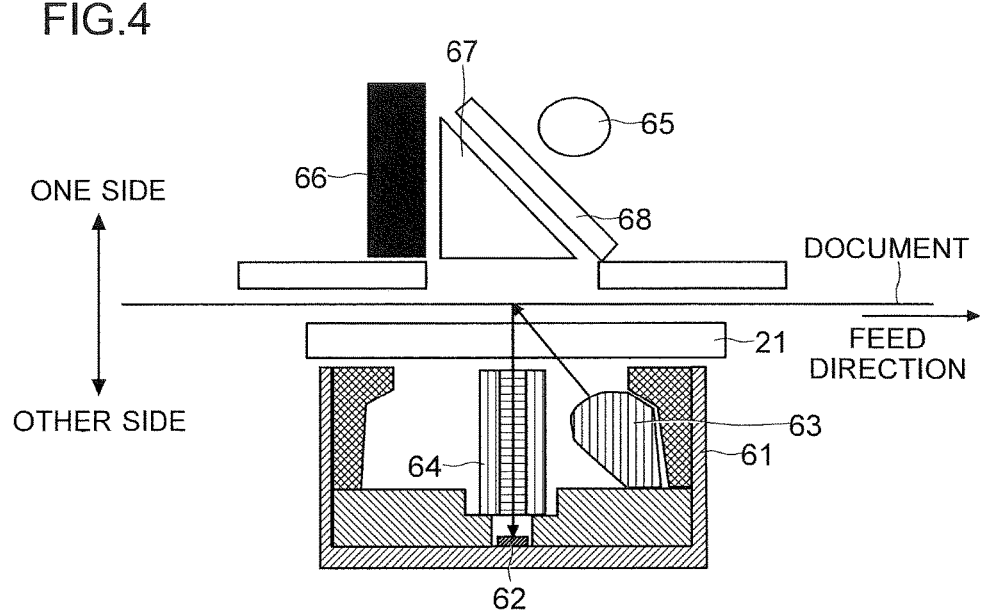
FIG. 4 is an enlarged view of a feed reading contact glass portion according to the embodiment.
Figure 5:
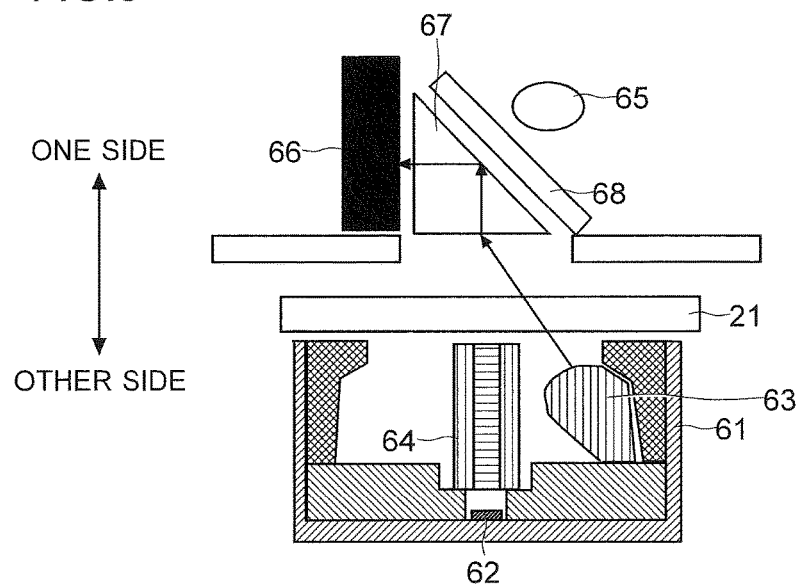
FIG. 5 is an enlarged view of the feed reading contact glass portion according to the embodiment.
Figure 6:
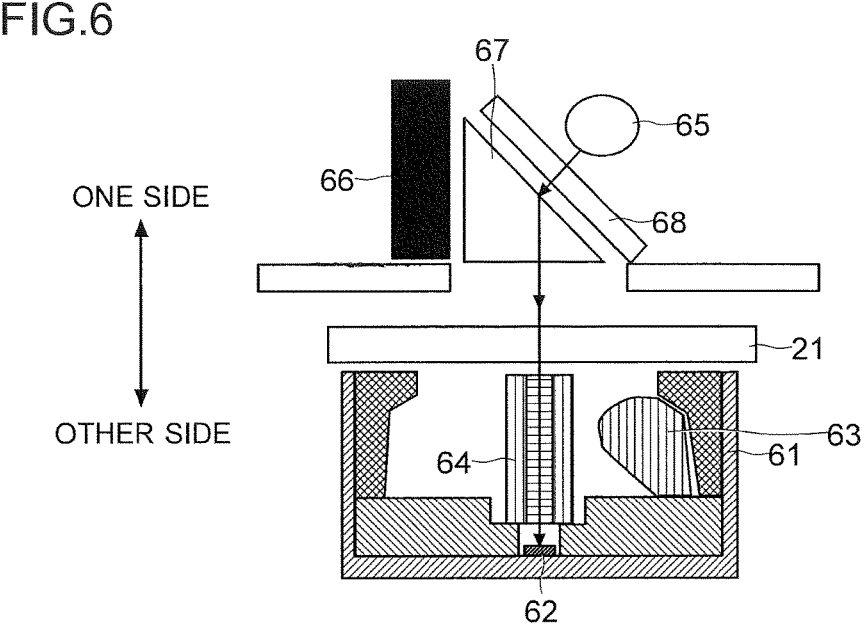
FIG. 6 is an enlarged view of the feed reading contact glass portion according to the embodiment.

Next, with reference to FIG. 4, a mechanism related to the feed reading by the image reading device 100 according to the embodiment is described. As shown in FIGS. 4 to 6, the reader unit 6 is disposed on the lower side (the other side) of the feed reading contact glass 21. The reader unit 6 has a casing 61 having a substantially U-shaped cross section. The direction perpendicular to the paper plane of FIGS. 4 to 6 is the longitudinal direction of the casing 61. The longitudinal direction of the casing 61 is the main scanning direction.

The image sensor 62, a first lamp 63, and a rod lens array 64 are disposed in the casing 61 of the reader unit 6. In other words, the image sensor 62, the first lamp 63, and the rod lens array 64 are disposed on the lower side (the other side) of the feed reading contact glass 21. The fed document passes the upper side (one side) of the feed reading contact glass 21.

Figure 7:
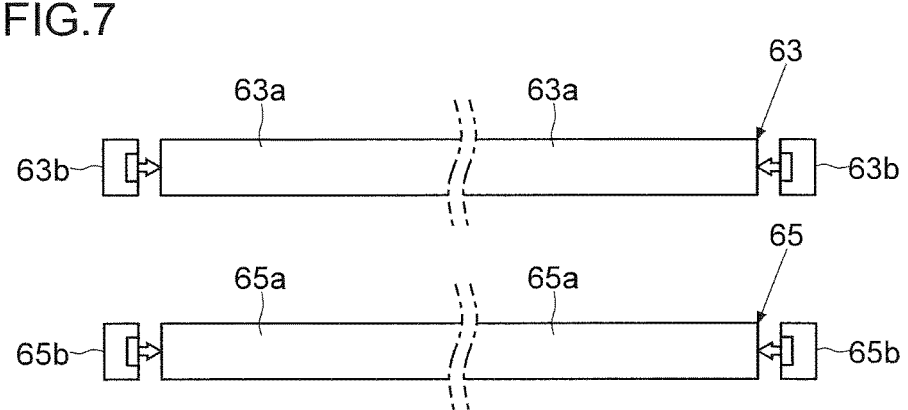
FIG. 7 is a diagram showing an example of a first lamp and a second lamp according to the embodiment.

In FIGS. 4 to 6, the first lamp 63 is disposed on the right side of the rod lens array 64 (the image sensor 62, a read line). As shown in FIG. 7, the first lamp 63 includes a rod-like (linear) first light guide member 63a. In addition, as shown in FIG. 7, a first light source 63b is disposed on each end in the longitudinal direction of the first light guide member 63a. For example, the first light source 63b is an LED.

The first light guide member 63a is parallel to the main scanning direction. The first light guide member 63a transmits the light entering the end portion (end surface) along the main scanning direction. A plurality of reflecting portions (reflecting plates) are arranged in the main scanning direction in the first light guide member 63a. An interval between the reflecting portions is smaller as being farther from the light source. Each reflecting portion partially reflects the light entering the end portion. The light reflected by the reflecting portion outgoes from an emission surface. As a result, the first light guide member 63a (first lamp 63) emits uniform light in a belt shape along the main scanning direction. When reading a document, the read control unit 20 turns on the first lamp 63 (first light source 63b). The first lamp 63 irradiates the feed reading contact glass 21 and the fed document with light along the main scanning direction. The first lamp 63 emits light to one side of the feed reading contact glass 21.

The image sensor 62 is disposed on the bottom surface inside the casing 61. The light emitted from the first light source 63b and reflected by the document enters the image sensor 62. The image sensor 62 is a line sensor. The image sensor 62 includes a plurality of light receiving elements (photoelectric conversion elements) arranged in the main scanning direction (the direction perpendicular to the paper plane of FIGS. 4 to 6). The image sensor 62 is longer than the short side of the paper sheet of A3 size so that the paper sheet of A3 size can be read. A clock signal having a predetermined frequency is input to the image sensor 62. Outputs of the light receiving elements are sequentially input to the image data generating unit 7 (A/D converter unit 71) in accordance with the clock signal.

The rod lens array 64 is disposed between the image sensor 62 and the feed reading contact glass 21. In other words, the rod lens array 64 is disposed above the image sensor 62. The rod lens array 64 includes a plurality of rod lenses arranged in the main scanning direction. The rod lens array 64 guides the reflected light from an object to be read (document) to the image sensor 62.

As shown in FIGS. 4 to 6, a second lamp 65, a light absorbing member 66, a right angle prism 67, and a diffusion plate 68 are disposed on the upper side (one side) of the feed reading contact glass 21. The second lamp 65 is disposed at a position farther from the feed reading contact glass 21 than the document feeding path. The second lamp 65 emits light to the image sensor 62. In other words, the second lamp 65 emits light from the upper side of the document feeding path. As shown in FIG. 7, the second lamp 65 has the same structure as the first lamp 63. The second lamp 65 includes a rod-like (linear) second light guide member 65a. The second light guide member 65a is similar to the first light guide member 63a. In addition, as shown in FIG. 7, a second light source 65b is disposed on each end in the longitudinal direction of the second light guide member 65a. The second light source 65*b* is an LED, for example. The same specification of LED can be used for the first light source 63*b* and the second light source 65*b*.

The light absorbing member 66 is irradiated with the light emitted from the first lamp 63 and transmitted by the feed reading contact glass 21. The light absorbing member 66 is a black color member, for example. The light absorbing member 66 absorbs the light from the first light source 63*b*. The light absorbing member 66 absorbs light more than the paper sheet (of white color). In other words, the light absorbing member 66 is a member having a lower reflectance than the paper sheet. As shown in FIGS. 4 and 6, the right angle prism 67 is disposed among the light absorbing member 66, the second lamp 65, and the feed reading contact glass 21. As shown in FIG. 4, the light emitted from the first lamp 63 and reflected by the document passes through the rod lens array 64 and enters the image sensor 62.

As shown in FIG. 5, the light emitted from the first lamp 63 and transmitted by the contact glass enters the right angle prism 67. In other words, the light emitted from the first lamp 63 and not reflected by the document enters the right angle prism 67. The right angle prism 67 is disposed (mounted) so that the light from the first lamp 63 enters the light absorbing member 66. As a result, the light emitted from the first lamp 63 and not reflected by the document enters the light absorbing member 66.

In addition, the right angle prism 67 receives light from the second lamp 65. As shown in FIG. 6, the right angle prism 67 is disposed (mounted) so that the light from the second lamp 65 irradiates the contact glass and the image sensor 62. In addition, the diffusion plate 68 is disposed between the second lamp 65 and the right angle prism 67. The diffusion plate 68 diffuses and transmits the light from the second lamp 65. In this way, uniform light irradiates the right angle prism 67, the fed document, and the feed reading contact glass 21 along the main scanning direction.

(Flow of Feed Reading)

Next, with reference to FIGS. 3 and 8, an example of flow of the feed reading by the image reading device 100 according to the embodiment is described. FIG. 8 is a flowchart showing an example of flow of the feed reading by the image reading device 100 according to the embodiment.

In this description, a case where one document sheet is read by the feed reading is described. The flowchart of FIG. 8 is an example of flow in case where one document sheet is read by the feed reading. When a plurality of document sheets are set on the document tray 11, the flowchart of FIG. 8 is executed for each document sheet.

The flow of FIG. 8 starts at a time point when reading of the document set on the document tray 11 is started. For example, it starts at a time point when a job of reading the document is set with the operation panel 5 and the start key is operated. In addition, the document is set on the document tray 11. First, the document feed control unit 10 controls to start feeding of the document (Step #11). Specifically, the document feed control unit 10 controls the document feed motor 18 to rotate. Note that a steady rotation speed of the document feed motor 18 is set in advance. For example, the steady rotation speed is set to a speed for feeding the document at a predetermined speed. The predetermined speed is a speed at which the document is fed by one line (by one pixel) in the sub-scanning direction in a document reading period of one line.

As feeding of the document is continued, the read control unit 20 recognizes before long that the front end of the document has reached a predetermined position (Step #12). A document detection sensor 26 is disposed at the predetermined position (see FIG. 2). FIG. 2 shows an example in which the document detection sensor 26 is disposed in the vicinity of the feed roller pair 14 that is closest to the feed reading contact glass 21 on the upstream side thereof. The document detection sensor 26 is an optical sensor, for example. The output level of the document detection sensor 26 is different depending on whether or not presence of the document is detected. The output of the document detection sensor 26 is input to the read control unit 20. The read control unit 20 recognizes that the front end of the document has reached the position at which the document detection sensor 26 is disposed. In addition, the read control unit 20 recognizes that the rear end of the document has passed the position at which the document detection sensor 26 is disposed.

When a predetermined time elapses after recognizing that the front end has reached, the read control unit 20 starts to read one line of the document (Step #13). For example, the predetermined time can be appropriately determined. The image reading device 100 can accurately recognize an end (a contour) of the document (as described later in detail). It is not necessary to start reading simultaneously when the front end of the document reaches the read line on the feed reading contact glass 21, unlike the conventional structure. Therefore, it is possible to start reading before the front end of the document reaches the read line.

The reading period of one line is divided into a first period and a second period. For example, the reading period of one line is divided into two equal halves. The first half is the first period. The second half is the second period. It is possible to set the second half as the first period and to set the first half as the second period. In the first period, the read control unit 20 controls the image sensor 62 to read the document with the reflected light (Step #14). In Step #14, the read control unit 20 turns on the first lamp 63 (first light source 63*b*) and turns off the second lamp 65 (second light source 65*b*). In the second period, the read control unit 20 controls the image sensor 62 to read the document with the transmitted light (Step #15). In Step #15, the read control unit 20 turns off the first lamp 63 (first light source 63*b*) and turns on the second lamp 65 (second light source 65*b*). The image reading device 100 perform reading two times per line.

A result of reading in the first period (the analog electric signal of each light receiving element) is input to the image data generating unit 7. A result of reading in the second period (the analog electric signal of each light receiving element) is also input to the image data generating unit 7. The image data generating unit 7 generates first image data of one line based on the output of the image sensor 62 in reading in the first period. The image data generating unit 7 generates second image data of one line based on the output of the image sensor 62 in reading in the second period (Step #16). The first image data and the second image data of each line are stored in the image memory 73. For example, the image memory 73 stores at least one page of the first image data and the second image data.

The read control unit 20 checks whether or not reading of one page is completed (Step #17). In other words, the read control unit 20 checks whether or not reading of all lines in the sub-scanning direction is completed. For example, reading is continued after the rear end of the document has passed the position at which the document detection sensor 26 is disposed until a predetermined time elapses. The reading may be finished after the rear end of the document passes the read line. When the reading is completed (Yes in Step #17), this flow is finished (END). When the reading is not completed (No in Step #17), the flow returns to Step #14 and the next line is read.

(Determination of Pixel with Document Data and Pixel without Document Data)

Next, with reference to FIGS. 3, 9, 10, and 11, there is described an example of flow of determination of a pixel with document data and a pixel without document data by the image reading device 100 according to the embodiment. As described above, in the feed reading, the first image data and the second image data are obtained for one page document. In this determination, the first image data of one page and the second image data of one page are used. The first image data can be said to be a bundle of image data of lines of the document read with light from the first lamp 63. The second image data can be said to be a bundle of image data of lines of the document read with light from the second lamp 65.

A flow shown in FIG. 9 starts at a time point when reading of one page document is completed. At this time point, the image memory 73 stores at least one page of the first image data and the second image data. The determining unit 8 determines whether each pixel of the first image data is a pixel with document data or a pixel without document data based on the first image data and the second image data (Step #21). The pixel with document data is a pixel having read document data. The pixel without document data is a pixel having no read document data. The determining unit 8 is a circuit disposed in the image reading device 100 (image reader unit 2). For performing this determination, the determining unit 8 includes a determination circuit 80. The determination circuit 80 refers to a density value (pixel value) of a pixel of the first image data and a density value (pixel value) of a pixel of the second image data at the same position.

The determining unit 8 determines a pixel having a density value brighter than a predetermined first threshold value Th1 in the first image data to be a pixel with document data (Step #21). In the first image data, there are two factors for a pixel to have a black (thick or dark) density value. Because of the light absorbing member 66, the background of the image sensor 62 has black or high density color. For this reason, a pixel with no reflected light from the document (pixel having no read document data) has a dark density value. In addition, a pixel having read document data at a black (dark) part also has a dark density value.

On the other hand, in the first image data, a pixel having read document data at a bright part has a bright density value. Therefore, the determining unit 8 regards the pixel having a density value whiter (brighter or thinner) than the first threshold value Th1 in the first image data as a pixel with document data. The first threshold value Th1 may be stored in a nonvolatile manner in the scanner memory 20b (or in the storage unit 31). The first threshold value Th1 can be appropriately determined. For example, the first threshold value Th1 may be a median between the maximum value and the minimum value of the density value. For example, when one pixel has 8 bits, the first threshold value Th1 may be approximately 128. The first threshold value Th1 may be a value darker than the median. The first threshold value Th1 may be a value brighter than the median.

The determining unit 8 checks a dark pixel having a density value darker than a predetermined second threshold value Th2 in the second image data, and determines a pixel in the first image data at a position corresponding to the dark pixel to be a pixel with document data (Step #21). In the second image data, a pixel at which light from the second lamp 65 (transmitted light) is blocked by the document has a black (dark or thick) density value. In addition, a pixel at which light from the second lamp 65 (transmitted light) is not blocked by the document has a white (bright or thin) density value. Therefore, the determining unit 8 regards a pixel in the first image data corresponding to the dark pixel as a pixel with document data.

The second threshold value Th2 may be stored in a nonvolatile manner in the scanner memory 20b (or in the storage unit 31). The second threshold value Th2 can be appropriately determined. For example, the second threshold value Th2 may also be a median between the maximum value and the minimum value of the density value (a median of gradation). The second threshold value Th2 may be a darker value or a brighter value than the median.

The determining unit 8 checks a bright pixel in the second image data, which has a density value equal to or brighter than the second threshold value Th2. The determining unit 8 determines a pixel in the first image data at a position corresponding to the bright pixel, which has a density value equal to or darker than the first threshold value Th1, to be a pixel without document data. The determining unit 8 determines a pixel, at which it is regarded that light from the second lamp 65 has sufficiently reached, and that light from the first lamp 63 is absorbed by the light absorbing member 66, to be a pixel without document data.

On the basis of a table of FIG. 10, the determining unit 8 performs the determination in Step #21.

Note that a thick document causes a decrease in intensity of reflected light of the light from the first lamp 63. For this reason, a pixel having read document data at a thick part may have a density value darker than the first threshold value Th1. However, intensity of transmitted light of the light from the second lamp 65 is also decreased. In other words, a document with thick background causes low transmittance, too. For this reason, concerning a pixel having read document data, there is no case where a density value of the first image data becomes dark with the reflected light and a density value of the second image data is bright.

Figure 11:
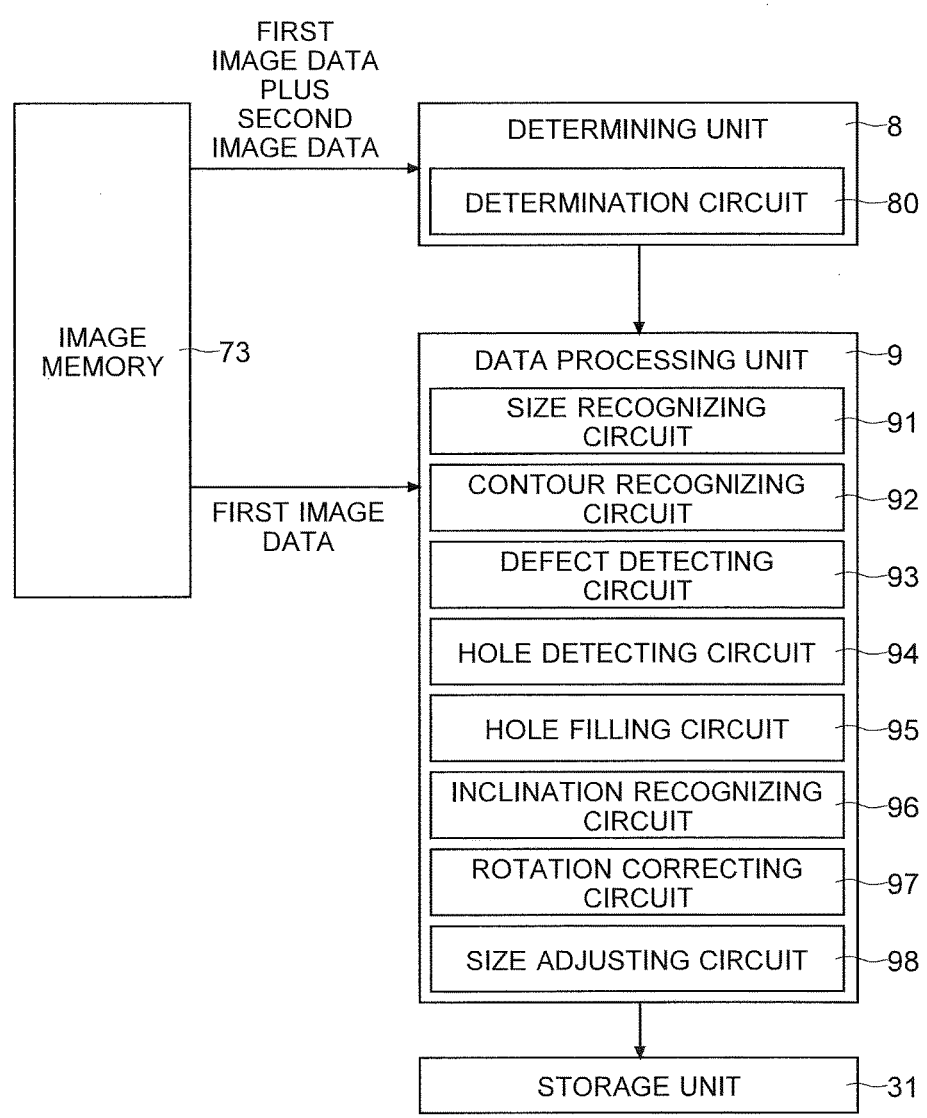
FIG. 11 is a diagram showing an example of a determining unit and a data processing unit according to the embodiment.

On the basis of a result of the determination by the determining unit 8, the data processing unit 9 performs processing of the first image data. For example, the data processing unit 9 recognizes a document size based on widths of an area of pixels with document data in the first image data (Step #22). As shown in FIG. 11, in order to recognize a document size, the data processing unit 9 includes a size recognizing circuit 91, for example. The size recognizing circuit 91 performs processing and calculation concerning document size recognition. Note that in the description below, the main scanning direction is the up and down direction, and the sub-scanning direction is the left and right direction, in the first image data.

The data processing unit 9 recognizes a pixel closest to one end in the main scanning direction (upper end pixel) and a pixel closest to the other end in the main scanning direction (lower end pixel), in the first image data. The data processing unit 9 determines a distance between the upper end pixel and the lower end pixel in the main scanning direction (i.e. in the up and down direction). In other words, the data processing unit 9 determines the number of pixels from the upper end pixel to the lower end pixel in the main scanning direction. The data processing unit 9 multiplies the determined number of pixels by a width of one pixel so as to calculate a width of the document in the main scanning direction. The width of one pixel is determined by a read resolution. In case of 600 dpi, a width of one pixel is 25.4 mm (1 inch)/600≈42.3 μm.

In the same manner, the data processing unit 9 recognizes a pixel closest to one end in the sub-scanning direction (left end pixel) and a pixel closest to the other end in the sub-scanning direction (right end pixel), in the first image data. The data processing unit 9 determines a distance between the left end pixel and the right end pixel in the sub-scanning direction (i.e. in the left and right direction). In other words, the data processing unit 9 determines the number of pixels from the left end pixel to the right end pixel in the sub-scanning direction. The data processing unit 9 multiplies the determined number of pixels by a width of one pixel so as to calculate a width of the document in the sub-scanning direction. The data processing unit 9 recognizes a standard size of the paper sheet closest to the determined widths in the main scanning direction and in the sub-scanning direction as a document size.

Next, on the basis of a result of the determination of pixels with document data and pixels without document data in the first image data, the data processing unit 9 recognizes a contour of the document (Step #23). In other words, the data processing unit 9 recognizes the boundary between pixels with document data and pixels without document data. As shown in FIG. 11, in order to recognize a contour of the document, the data processing unit 9 includes a contour recognizing circuit 92, for example. The contour recognizing circuit 92 performs processing and calculation concerning document contour recognition.

An example of a method for contour recognition is described below. For example, the data processing unit 9 scans the first image data from the upper left to the lower right. The data processing unit 9 regards the first pixel with document data as a first noted pixel. The data processing unit 9 looks for a pixel with document data among eight pixels around the noted pixel. As to the first noted pixel, when looking for a pixel with document data, the data processing unit 9 looks around the noted pixel in a clockwise direction from the left pixel. The data processing unit 9 sets a first found pixel with document data as a next noted pixel. Then, as to the second or later noted pixel, the data processing unit 9 looks around not from the left pixel but from the last pixel without document data found in the last one round. The data processing unit 9 sets a first found pixel with document data as a next noted pixel. Setting of the noted pixel is repeated, and when returning to the first noted pixel, the contour recognition is finished. In the processing, a line tracking the selected noted pixels becomes an outer contour line of the document. Note that the document contour may be recognized based on other algorithm.

When a document having breakage or fold is read, not all information of the document can be read. Therefore, the data processing unit 9 detects a defect (breakage or fold) of the document based on the recognized contour (Step #24). As shown in FIG. 11, in order to recognize a defect of the document, the data processing unit 9 includes a defect detecting circuit 93, for example. The defect detecting circuit 93 performs processing and calculation concerning document defect detection.

An example of defect detection is described. The document usually has a rectangular shape. A contour of the area of pixels with document data is a straight line or an almost straight line. In addition, a corner of the document has a right angle or an almost right angle. An outer contour of a document without a defect includes two lines parallel or almost parallel to the main scanning direction (up and down direction). An outer contour of a document without a defect includes two lines parallel or almost parallel to the sub-scanning direction (left and right direction). Therefore, the data processing unit 9 determines a straight line of the document contour, which has a certain length or more. The data processing unit 9 may determine that the document has a defect in case where there is a straight line having an angle (inclination) beyond a predetermined allowed range. The data processing unit 9 may determine that the document has no defect in case where there is no straight line having an angle (inclination) beyond a predetermined allowed range.

In addition, the data processing unit 9 determines a document size. It is possible to use the determined document size for detecting a defect of the document. A part having breakage or fold has no document data. A pixel having read document data at a part having breakage or fold becomes a pixel without document data. In case there is breakage or fold, the number of pixels without document data is increased. Therefore, the data processing unit 9 selects one of pixels corresponding to corners among pixels with document data in the first image data. In other words, the data processing unit 9 selects a pixel with document data corresponding to one of the upper right, the upper left, the lower right, and the lower left of the document. For example, the data processing unit 9 scans the first image data from the upper left to the lower right. Further, the data processing unit 9 selects the first pixel with document data. In this case, the data processing unit 9 has selected a pixel in the first image data corresponding to the upper left corner of the document.

Further, the data processing unit 9 superposes a corner of the rectangular frame corresponding to the determined document size and the selected pixel with document data. For example, when a pixel corresponding to the upper left corner of the document is selected, the data processing unit 9 superposes the selected pixel and the upper left corner of the rectangular frame corresponding to the document size. Then, the data processing unit 9 counts the number of pixels without document data in the rectangular frame. In case where the number of pixels without document data is a certain value or more, the data processing unit 9 determines that the document has a defect. In case where the number of pixels without document data is less than the certain value, the data processing unit 9 determines that the document has no defect. Note that a document defect may be detected by other algorithm.

When a document defect is detected, the read control unit 20 controls the operation panel 5 to notify that the document has a defect (breakage or fold) (Step #25). The user who sets the document is near the image reading device 100 (multi-function peripheral 200). Accordingly, the read control unit 20 controls the display panel 51 to display a message indicating that the document has a defect. In this way, the user recognizes abnormality of the document. Note that Step #25 is skipped in case where no document defect is detected.

Next, the data processing unit 9 detects a hole area (Step #26). The hole area is an area in which a hole such as a punch hole formed in the document is read. The hole area is an area within the first image data and is an area of pixels without document data surrounded by pixels with document data. The pixel without document data is a dark (black) pixel. In other words, in the first image data, the hole area is an area in which thick pixels are gathered. The hole area is an unnecessary area. Therefore, the data processing unit 9 deletes the hole area.

As shown in FIG. 11, in order to detect the hole area, the data processing unit 9 includes a hole detecting circuit 94, for example. The hole detecting circuit 94 performs processing and calculation concerning hole area detection. The hole detecting circuit 94 searches for a hole area in the first image data. The data processing unit 9 changes density values of the pixels in the hole area in the first image data to white or background color value (Step #27). As shown in FIG. 11, the data processing unit 9 includes a hole filling circuit 95 that converts density values of the pixels in the hole area. Note that in case where there is no hole area, Step #27 is skipped.

The data processing unit 9 may convert density values of the pixels without document data in the hole area into a white color value. In addition, the data processing unit 9 may convert density values of the pixels without document data in the hole area into a background color value. When converting into a background color, the data processing unit 9 generates a histogram of pixels with document data. The histogram is frequency distribution of density values of pixels. For example, the data processing unit 9 determines a density value of the highest frequency (the number of occurrences) to be the background color.

Next, the data processing unit 9 recognizes an inclination direction and an inclination amount of the document (Step #28). As shown in FIG. 11, in order to recognize an inclination direction and an inclination amount (degree), the data processing unit 9 includes an inclination recognizing circuit 96, for example. The inclination recognizing circuit 96 performs processing and calculation concerning inclination direction and inclination amount detection. Note that in the feed reading, the document is guided and fed. A document that is largely inclined causes jamming. A document is not largely inclined. Inclination of a document is a few degrees at most.

On the basis of coordinates of two pixels positioned on the boundary between the pixels with document data and pixels without document data in the first image data, inclination of the first image data can be detected. For example, the data processing unit 9 extracts two pixels with document data, which are pixels on the document contour and on the same straight line parallel or almost parallel to the main scanning direction. For example, the data processing unit 9 selects a pixel with document data positioned at the upper left corner and a pixel with document data at the lower left corner in the first image data. The data processing unit 9 determines the straight line connecting the two pixels based on coordinates of the two pixels. The inclination direction can be known based on whether inclination of the determined straight line is positive or negative. The inclination amount (degree) can be determined based on the inclination of the determined straight line.

The data processing unit 9 performs a rotation process of the first image data so that the inclination is canceled (Step #29). As shown in FIG. 11, the data processing unit 9 includes a rotation correcting circuit 97, for example. The rotation correcting circuit 97 performs processing and calculation concerning rotation of the image data. In this way, inclination of the first image data is corrected. In addition, the data processing unit 9 adjusts a size of the first image data so as to match the recognized document size (Step #210). As shown in FIG. 11, the data processing unit 9 includes a size adjusting circuit 98. The size adjusting circuit 98 performs processing and calculation concerning size adjustment.

For example, the data processing unit 9 scans the image data after the rotation process. For example, the data processing unit 9 scans the first image data after the rotation process from the upper left to the lower right. The data processing unit 9 determines the first pixel with document data to be a reference pixel. The data processing unit 9 performs trimming using the reference pixel as a reference. For example, the data processing unit 9 superposes the upper left corner of the rectangular frame corresponding to the recognized document size and the reference pixel. Then, the data processing unit 9 deletes pixels outside the rectangular frame. The data processing unit 9 left pixels inside the rectangular frame. It is possible to adjust a size of the first image data by other method.

The first image data after the size adjustment is output to the storage unit 31 (Step #211). Then, this flow is finished (END). Note that the data output to the storage unit 31 is used for a copy or transmission job. When the job is executed, the image processing unit 3b performs image processing based on setting with the operation panel 5 on the image data in the storage unit 31. The data after the image processing is used for a job such as copying or transmission. In addition, the second image data is discarded.

The image reading device 100 is provided with the light absorbing member 66. In the light from the first lamp 63, light that is not reflected by the document is guided to the light absorbing member 66. In other words, the background for the image sensor 62 becomes black. For this reason, pixels having read document data at a part having a low density in the document become bright (white). In other words, in the first image data, pixels having read document data at a part having a low density in the document have bright density values. On the other hand, in the first image data, pixels having read document data at a part having a high density in the document have dark (black) density values. In addition, pixels having read document data at a part having no document also have dark density values.

In addition, the second lamp 65 emits light to the image sensor 62. The image sensor 62 reads light emitted from the second lamp 65 and transmitted by the contact glass and the document (transmitted light). As a result of reading the transmitted light, the second image data is obtained. In case where a document exists, the light from the second lamp 65 is reflected by the document. In a part where no document exists, the light from the second lamp 65 enters the image sensor 62. In the second image data, pixels corresponding to a part where no document exists have bright (white) density values. Pixels corresponding to a part where a document exists have dark (black) density values.

Thus, the image reading device 100 according to the embodiment includes the contact glass (feed reading contact glass 21), the first lamp 63, the image sensor 62, the light absorbing member 66, the second lamp 65, the control unit (read control unit 20), and the determining unit 8. A document is fed on one side of the contact glass. The first lamp 63 is disposed on the other side of the contact glass. The first lamp 63 emits light to the one side of the contact glass. The image sensor 62 is disposed on the other side of the contact glass. The image sensor 62 receives light emitted from the first lamp 63 and reflected by the document. The light absorbing member 66 is disposed on the one side of the contact glass. The light absorbing member 66 is disposed at a position irradiated with the light emitted from the first lamp 63 and transmitted by the contact glass. The second lamp 65 is disposed on the one side of the contact glass. The second lamp 65 is disposed at a position farther from the contact glass than the document feeding path and emits light to the image sensor 62. When reading a document, in a reading period of one line, the control unit controls to read with the reflected light by turning on the first lamp 63 while turning off the second lamp 65 in the first period, and controls to read with the transmitted light by turning on the second lamp 65 while turning off the first lamp 63 in the second period. The determining unit 8 determines whether each pixel in the first image data is a pixel with document data that is a pixel having read document data or a pixel without document data that is a pixel having no read document data, on the basis of the first image data obtained by reading in the first period and the second image data obtained by reading in the second period. The determining unit 8 determines a pixel in the first image data having a density value brighter than the predetermined first threshold value Th1 to be the pixel with document data. The determining unit 8 checks a dark pixel in the second image data having a density value darker than the predetermined second threshold value Th2, and determines a pixel in the first image data at a position corresponding to the dark pixel to be the pixel with document data. In this way, in the first image data, a pixel having read document data (pixel with document data) can be accurately distinguished. It is possible to correctly obtain information such as an end position, an inclination, and presence or absence of a hole in the document.

In addition, the determining unit 8 checks a bright pixel in the second image data having a density value equal to or brighter than the second threshold value Th2, and determines a pixel in the first image data at a position corresponding to the bright pixel, which is a pixel having a density value equal to or dark than the first threshold value Th1, to be the pixel without document data. In this way, in the first image data, a pixel having no read document data (pixel without document data) can be accurately distinguished. Thus, it is possible to correctly obtain information such as an end position, a document contour, an inclination, and presence or absence of a hole in the document.

In addition, the right angle prism 67 is disposed on the one side of the contact glass. The right angle prism 67 is disposed to receive the light emitted from the first lamp 63 and transmitted by the contact glass so that the light from the first lamp 63 enters the light absorbing member 66. In addition, the right angle prism 67 is disposed to receive the light from the second lamp 65 so that the light from the second lamp 65 emerges to the contact glass and the image sensor 62. In this way, the light from the first lamp 63 can be guided to the light absorbing member 66. In addition, the light from the second lamp 65 can be guided in the direction to the image sensor 62.

In addition, the image reading device 100 includes the diffusion plate 68, which is disposed between the second lamp 65 and the right angle prism 67, and transmits the light from the second lamp 65 while it diffuses the light from the second lamp 65. In this way, it is possible to diffuse the light from the second lamp 65 to the image sensor 62. The light from the second lamp 65 can be uniformed in the main scanning direction. In addition, the image reading device 100 includes the data processing unit 9 that recognized a document size based on widths of the area of pixels with document data in the first image data. It is possible to correctly detect the document size.

In addition, the data processing unit 9 recognizes a document contour based on a result of the determination of pixels with document data and pixels without document data, and detects a document defect based on the recognized document contour. In addition, the image reading device 100 includes a notifying unit (operation panel 5) that notifies detection of a document defect. In this way, a document defect (breakage or fold) can be detected based on an abnormality of the document contour. Then, fold or breakage of a document can be notified to the user. It is possible to notify the user that it is necessary to amend the fold or the breakage for correctly read the document.

In addition, the data processing unit 9 detects an area in the first image data, which is an area of pixels without document data surrounded by pixels with document data, and changes density values of the pixels in the hole area to a white or background color value. In this way, it is possible to correctly detect a hole such as a punch hole formed in the document. Further, it is possible to correctly delete the image of the unnecessary hole included in the first image data. In addition, it is possible to make the image of the unnecessary hole included in the first image data be less conspicuous.

In addition, the data processing unit 9 determines inclination direction and inclination amount based on the boundary between the pixels with document data and pixels without document data, and performs a rotation process of the first image data so that the inclination is canceled. In this way, it is possible to correctly recognize inclination direction and degree of the fed document. Then it is possible to accurately correct the inclination of the first image data due to the inclination of the fed document. It is possible to obtain image data without inclination.

In addition, the image forming apparatus (multifunction peripheral 200) includes the image reading device 100. In the image data obtained by reading the document, the image forming apparatus can correctly distinguish a pixel having read document data from a pixel having no read document data. It is possible to provide an image forming apparatus that can obtain correct information about a document.

What is claimed is:

1. An image reading device comprising:
a contact glass having one side on which a document is fed;
a first lamp disposed on the other side of the contact glass so as to emit light to the one side of the contact glass;
an image sensor disposed on the other side of the contact glass so as to receive light emitted from the first lamp and reflected by the document;
a light absorbing member disposed on the one side of the contact glass at a position irradiated with light emitted from the first lamp and transmitted by the contact glass;
a second lamp disposed on the one side of the contact glass at a position farther from the contact glass than the document feeding path so as to emit light to the image sensor;
a control unit comprising a circuit board including a scanner CPU and a scanner memory, the control unit being configured to control to read with the reflected light by turning on the first lamp while turning off the second lamp in a first period of a reading period of one line when reading a document, and to control to read with the transmitted light by turning on the second lamp while turning off the first lamp in a second period; and
a determining unit comprising a determination circuit, the determining unit being configured to determine whether each pixel in the first image data is a pixel with document data that is a pixel having read document data or a pixel without document data that is a pixel having no read document data, on the basis of first image data obtained by reading in the first period and second image data obtained by reading in the second period, to determine a pixel in the first image data having a density value brighter than a predetermined first threshold value to be the pixel with document data, to check a dark pixel in the second image data having a density value darker than a predetermined second threshold value, and to determine a pixel in the first image data at a position corresponding to the dark pixel to be the pixel with document data.

2. The image reading device according to claim 1, wherein the determining unit checks a bright pixel in the second image data having a density value equal to or brighter than the second threshold value, and determines a pixel in the first image data at a position corresponding to the bright pixel, which is a pixel having a density value equal to or darker than the first threshold value, to be the pixel without document data.

3. The image reading device according to claim 1, wherein
a right angle prism is disposed on the one side of the contact glass,
the right angle prism is disposed to receive the light emitted from the first lamp and transmitted by the contact glass so that the light from the first lamp enters the light absorbing member, and
the right angle prism is disposed to receive the light from the second lamp so that the light from the second lamp emerges to the contact glass and the image sensor.

4. The image reading device according to claim 1, further comprising a diffusion plate disposed between the second lamp and the right angle prism, so as to transmit the light from the second lamp and to diffuse the light from the second lamp.

5. The image reading device according to claim 1, further comprising a size recognizing circuit configured to recognize a document size based on widths of an area of pixels with document data in the first image data.

6. The image reading device according to claim 5, further comprising:
an operation panel configured to notify detection of a document defect;
a contour recognizing circuit configured to recognize a document contour based on a result of the determination of pixels with document data and pixels without document data; and
a defect detecting circuit configured to detect a document defect based on the recognized document contour.

7. The image reading device according to claim 5, further comprising:
a hole detecting circuit configured to detect a hole area, which is an area within the first image data and is an area of pixels without document data surrounded by pixels with document data; and
a hole filling circuit configured to change density values of the pixels in the hole area to a white or background color value.

8. The image reading device according to claim 5, further comprising:
an inclination recognizing circuit configured to determine inclination direction and inclination amount based on the boundary between the pixels with document data and pixels without document data; and
a rotation correcting circuit configured to perform a rotation process of the first image data so that the inclination is canceled.

9. The image reading device according to claim 5, further comprising a size adjusting circuit configured to trim the first image data based on the recognized document size so as to adjust a size of the first image data.

10. The image reading device according to claim 1, wherein the reading period of one line is equally divided into two halves, and the first half is the first period while the second half is the second period, or the second half is the first period while the first half is the second period.

11. An image forming apparatus comprising the image reading device according to claim 1.

12. A method for controlling an image reading device, the method comprising:
feeding a document on one side of a contact glass;
disposing a first lamp on the other side of the contact glass;
making a first lamp to emit light to the one side of the contact glass;
disposing an image sensor on the other side of the contact glass;
making light emitted from the first lamp and reflected by the document enter the image sensor;
disposing a light absorbing member on the one side of the contact glass;
disposing the light absorbing member at a position irradiated with light emitted from the first lamp and transmitted by the contact glass;
disposing a second lamp on the one side of the contact glass at a position farther from the contact glass than a document feeding path;
making the second lamp emit light to the image sensor;
controlling to read with the reflected light by turning on the first lamp while turning off the second lamp in a first period of a reading period of one line when reading a document;
controlling to read with the transmitted light by turning on the second lamp while turning off the first lamp in a second period of the reading period of one line when reading a document;
determining whether each pixel in the first image data is a pixel with document data that is a pixel having read document data or a pixel without document data that is a pixel having no read document data, on the basis of the first image data obtained by reading in the first period and the second image data obtained by reading in the second period;
determining a pixel in the first image data having a density value brighter than a predetermined first threshold value to be the pixel with document data; and
checking a dark pixel in the second image data having a density value darker than the predetermined second threshold value, so as to determine a pixel in the first image data at a position corresponding to the dark pixel to be the pixel with document data.

* * * * *